United States Patent
Lee et al.

(10) Patent No.: US 7,949,750 B2
(45) Date of Patent: May 24, 2011

(54) APPARATUS AND METHOD FOR CONTROLLING ACCESS IN P2P NETWORK

(75) Inventors: Jae-won Lee, Yongin-si (KR); Hee-ycul Kim, Yongin-si (KR)

(73) Assignee: Samsung Electrinics Co., Ltd., Suwon-si (KR)

( * ) Notice: Subject to any disclaimer, the term of this patent is extended or adjusted under 35 U.S.C. 154(b) by 262 days.

(21) Appl. No.: 12/349,091

(22) Filed: Jan. 6, 2009

(65) Prior Publication Data

US 2009/0210544 A1  Aug. 20, 2009

(30) Foreign Application Priority Data

Feb. 14, 2008 (KR) ................................ 2008-013574

(51) Int. Cl.
*G06F 13/00* (2006.01)
(52) U.S. Cl. .................. 709/225; 709/219; 709/229
(58) Field of Classification Search .................. 709/217, 709/219, 223, 224, 225, 227, 229, 250
See application file for complete search history.

(56) References Cited

U.S. PATENT DOCUMENTS

| | | | |
|---|---|---|---|
| 7,512,649 B2 * | 3/2009 | Faybishenko et al. | 709/201 |
| 7,536,471 B2 * | 5/2009 | Oliver et al. | 709/232 |
| 7,769,996 B2 * | 8/2010 | Randle et al. | 713/153 |
| 2006/0005009 A1 * | 1/2006 | Ball et al. | 713/155 |
| 2009/0254977 A1 * | 10/2009 | Ghanea-Hercock | 726/4 |

FOREIGN PATENT DOCUMENTS

| | | |
|---|---|---|
| KR | 2007-6151 A | 1/2007 |
| WO | WO 99/36854 | 7/1999 |
| WO | WO 01/13201 A2 | 2/2001 |
| WO | WO 2004/057517 A2 | 7/2004 |

* cited by examiner

*Primary Examiner* — Viet Vu
(74) *Attorney, Agent, or Firm* — NSIP Law

(57) ABSTRACT

An apparatus and method to control access in a P2P (peer-to-peer) network. The apparatus for controlling access in a P2P network includes an attribute processing module to obtain an attribute of a service requestor and to determine an access control policy for the service requestor based on the obtained attribute; and an access control module to control the provision of a service to the service requester according to the access control policy. If a service provider is unable to obtain the attribute of the service requester, the service provider obtains the attribute of the service requester from at least one peer in the network.

18 Claims, 3 Drawing Sheets

APPARATUS AND METHOD FOR CONTROLLING ACCESS IN P2P NETWORK

CROSS-REFERENCE TO RELATED APPLICATION

This application claims the benefit of Korean Patent Application No. 2008-13574 filed in the Korean Intellectual Property Office on Feb. 14, 2008, the disclosure of which is incorporated herein by reference.

BACKGROUND OF THE INVENTION

1. Field of the Invention

Aspects of the present invention relate to an apparatus and method to control access in a peer-to-peer (P2P) network, and more particularly, to an apparatus and method to control access in a P2P network, in which an attribute is evaluated without the help of a central server during a remote service request to thereby control service access.

2. Description of the Related Art

When services are exchanged between users in a network, the most common access control method is that in which access to services for each user is controlled based on the identities of service requesters. To efficiently realize expanded implementations, an RBAC (Role-Based Access Control) method has been used in which service requesters are grouped together according to role, and access authorization is granted according to role. In RBAC, access authorization with respect to services is specified in an ACL (Access Control List) according to the identities or roles of service requesters. Based on such a scheme, a service provider provides services to service requesters that match their access authorizations.

An ABAC (Attribute-Based Access Control) method has been disclosed in an effort to provide access control that is more varied and segmented than RBAC. In ABAC, there are three main types of attributes that are used as a determination standard for access control. These attributes include attributes of service requesters, attributes of services, and attributes of service environment. Attributes of service requesters may include the age, name, etc., of service requesters; attributes of services may include the category of requested services; and attributes of service environment may include service request area, time, etc.

However, a drawback of conventional RBAC and ABAC methods is that registration with respect to the identity, role, and attribute of each user must be performed with the service provider beforehand. For example, in the case of ABAC, if a service requester that has not already been registered makes a request for a service, attribute inquiries to enable access control for the service requestor is not possible. Accordingly, there is a need for a method of dynamically performing access control with respect to service requesters having attributes that are not pre-registered with a service provider.

SUMMARY OF THE INVENTION

Aspects of the present invention provide an apparatus and method to control access in a P2P network, in which an attribute of a service requestor that is not pre-registered with a service provider is dynamically obtained in a P2P network environment to thereby perform access control.

Aspects of the present invention also provide an apparatus and method to control access in a P2P network, in which, during attribute evaluation of a service requester, the reliability of attribute evaluation is enhanced by taking into consideration a trustworthiness of a provider of an attribute.

According to an aspect of the present invention, there an apparatus to control access in a P2P network is provided. The apparatus includes an attribute processing module to obtain an attribute of a service requestor and to determine an access control policy for the service requester based on the obtained attribute, and an access control module to control the provision of a service to the service requester according to the access control policy. If a service provider is unable to obtain the attribute of the service requester, the service provider obtains the attribute of the service requester from at least one peer in the network.

According to another aspect of the present invention, a method of controlling access in a P2P network is provided. The method includes receiving a service request from a service requester, obtaining an attribute of the service requester, determining an access control policy for the service requestor based on the attribute of the service requester, and controlling the provision of a service to the service requestor according to the access control policy. If a service provider is unable to obtain the attribute of the service requestor when obtaining the attribute of the service requester, the service provider obtains the attribute of the service requester from at least one peer in the network.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Figure 1:
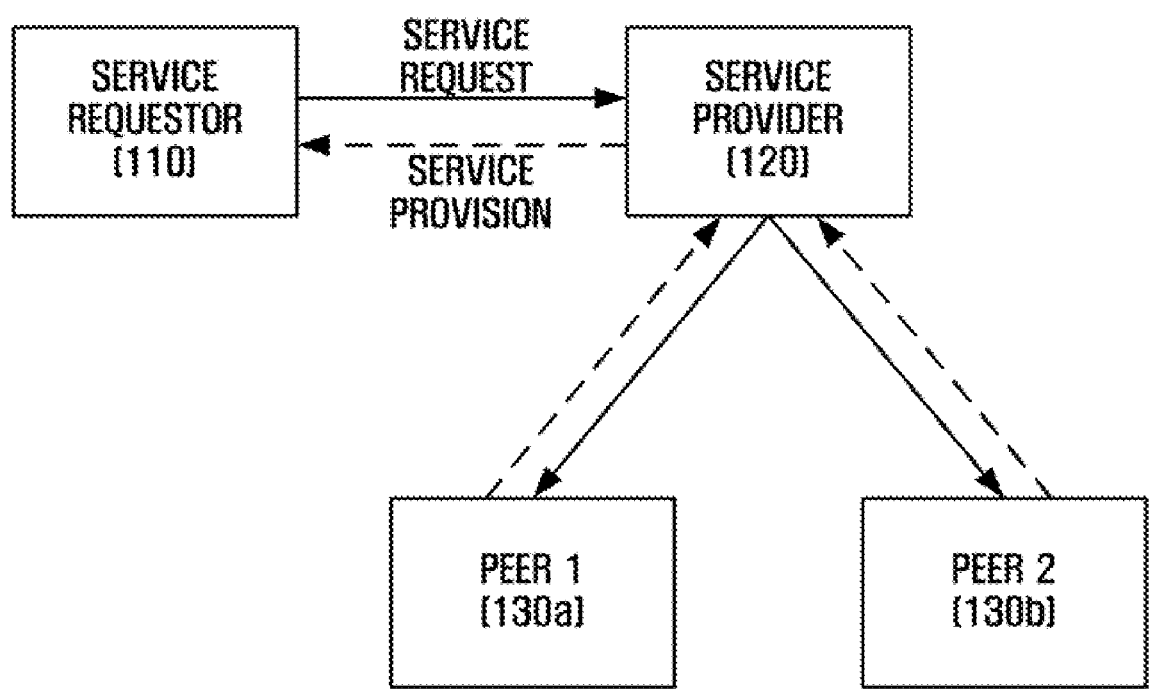
FIG. 1 is a schematic diagram of a service requester, a service provider, and peers in a P2P network according to an embodiment of the present invention.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

An apparatus and method to control access in a P2P network according to aspects of the present invention is described hereinafter with reference to the block diagrams and flowchart illustrations. It will be understood that each block of the flowchart illustrations, and combinations of blocks in the flowchart illustrations, can be implemented by computer program instructions. These computer program instructions can be provided to a processor of a general-purpose computer, special purpose computer, or other programmable data processing apparatus to produce a machine, such that the instructions, which execute via the processor of the computer or other programmable data processing apparatus, implement the operations specified in the flowchart block or blocks. These computer program instructions may also be stored in a computer usable or computer-readable memory that can direct a computer or other programmable data processing apparatus to operate in a particular manner, such that the instructions stored in the computer usable or computer-readable memory produce an article of manufacture including instructions to implement the operations specified in the flowchart block or blocks. The computer program instructions may also be loaded onto a computer or other programmable data processing apparatus to cause a series of operations to be performed on the computer or other programmable apparatus to produce a computer implemented process such that the instructions that execute on the computer or other programmable apparatus implement the operations specified in the flowchart block or blocks.

Further, each block of the flowchart illustrations may represent a module, segment, or portion of code, which comprises one or more executable instructions to implement the specified logical operation(s). It should also be noted that in some alternative implementations, the operations noted in the blocks may occur out of order. For example, two blocks shown in succession may in fact be executed substantially concurrently or the blocks may sometimes be executed in the reverse order, depending upon the functionality involved.

FIG. 1 shows a service requestor 110, a service provider 120, and peers 130 (such as peers 130a and 130b) in a P2P network according to an embodiment of the present invention. The service requestor 110, the service provider 120, and the peers 130 may each be any device capable of operating in a network, such as a server, a desktop computer, a laptop computer, a mobile phone, a set-top box, a personal digital assistant (PDA), or a personal entertainment device.

As shown in FIG. 1, the service requester 110 makes a request to the service provider 120 which has a service resource that is requested in a P2P network. The service provider 120, which receives the service request from the service requestor 110, provides a service to the service requestor 110 according to an access control policy. "Access control policy" refers to a standard for determining, according to one or more attributes, whether to provide a service to the service requester 110, or whether to provide all or part of a service to the service requester 110.

In the following tables, examples are provided of attributes of the service requestor 110 and of a service resource to provide movies at a movie site or movie theater.

TABLE 1

| Movie Rating | Service Requestor Age |
|---|---|
| R | 21 or older |
| PG-13 | 13 or older |
| G | All service requestors |

TABLE 2

| Movie Category | Service Requestor Membership Level |
|---|---|
| New releases | Premium level |
| Old releases | Regular level |

Age and membership level are designated as the attributes for the movie viewer (service requester 110), while movie rating and movie category are designated as the attributes for the service resource. When the movie viewer makes an access request for a specific movie to the movie theater (service provider 120), the service provider 120 determines whether to provide the movie according to the attribute rules outlined in Tables 1 and 2. For example, if the movie viewer is 25 years old and his or her membership level is "regular," the movie viewer is given authorization to view movies of R, PG-13, and G ratings that are "old releases." Hence, according to this particular access control policy of the service provider 120, the movie viewer would not be provided movies that fall under the category of "new releases."

When the service requestor 110 makes a service request to the service provider 120, the service provider 120 obtains the attributes of the service requester 110 from an attribute list where attributes of the service requester 110 are stored so as to determine an access control policy designated by the service provider 120. If the attributes of the service requestor 110 are not stored by the service provider 120, the service provider 120 queries another peer 130 cooperating in the network for the attributes of the service requester 110. Accordingly, even if the service provider 120 does not know the attributes of the service requestor 110, the attributes may be obtained from another peer 130 in the network to thereby dynamically perform attribute-based access control. Further, since aspects of the present invention are realized in a P2P network, queries of attributes can be made to an unspecified large number of peers 130a, 130b such that the probability of obtaining the attributes is high. However, aspects of the present invention are not limited to a particular type of network; aspects of the present invention may also be employed in any network in which a device may communicate with other devices to obtain attributes or other information.

Figure 2:
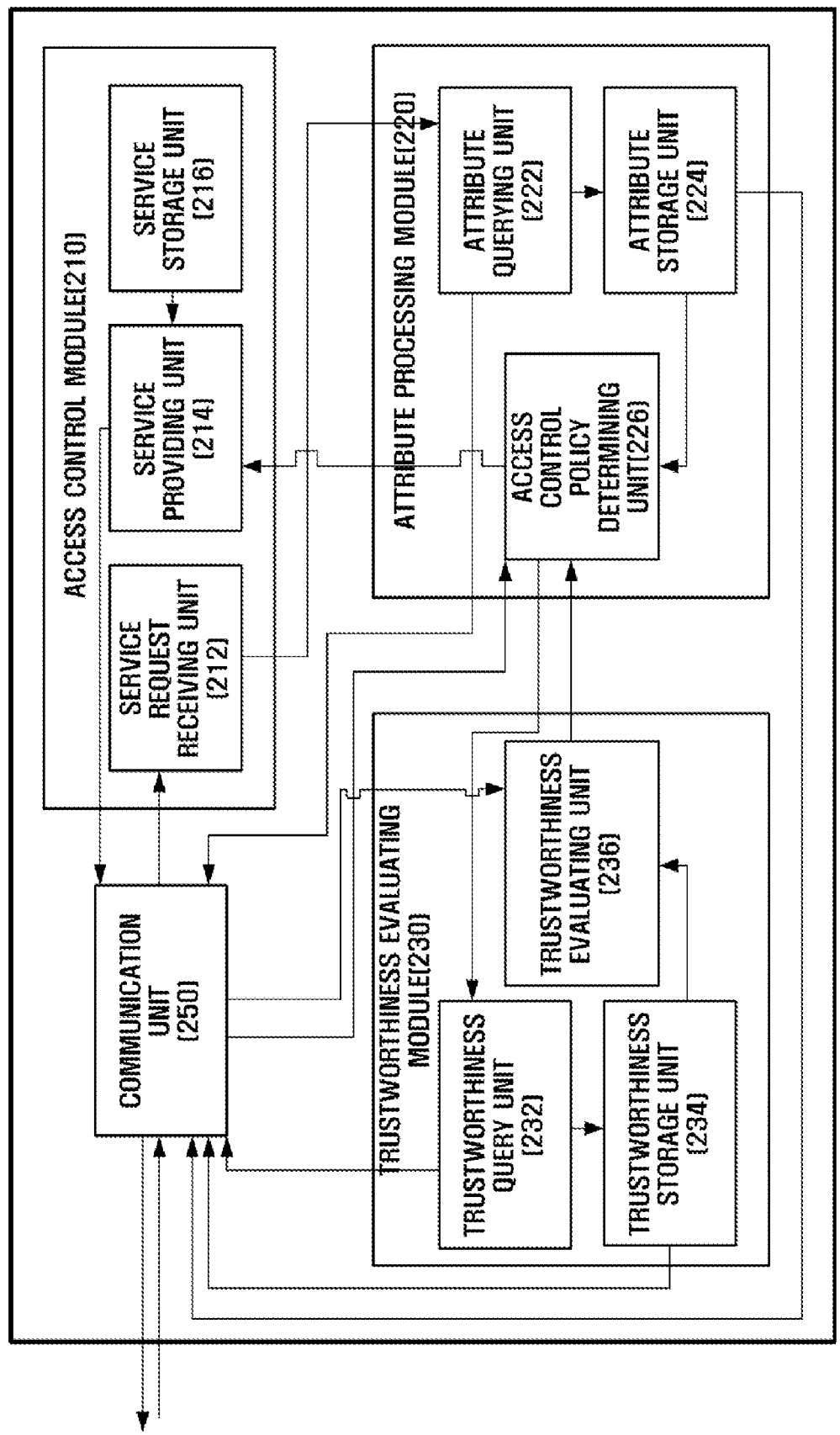
FIG. 2 is a block diagram of an apparatus to control access in a P2P network according to an embodiment of the present invention.

FIG. 2 is a block diagram of an apparatus 200 to control access in a P2P network according to an embodiment of the present invention. Aspects of the present invention are related to apparatuses that provide and receive services in a P2P network. Hence, the apparatus 110 may be included in the service requestor 110, the service provider 120, and/or the peers 130. Accordingly, the service requestor 110, the service provider 120, and the peers 130 may have a similar structure.

The apparatus 200 includes an attribute processing module 220 and an access control module 210. The apparatus 200 may further include a trustworthiness evaluating module 230. According to other aspects of the present invention, the apparatus 200 may include additional and/or different modules. Similarly, the functionality of two or more of the above modules may be integrated into a single unit.

The attribute processing module 220 determines an access control policy for the service requester 110 based on an attribute of the service requestor 110 when a service request is received from the service requester 110. The attribute processing module 220 includes an attribute query unit 222, an attribute storage unit 224, and an access control policy determining unit 226.

When a service request receiving unit 212, which remotely receives the service request from the service requester 100 in the P2P network, receives the service request from the service requestor 110, the attribute query unit 222 queries the attribute storage unit 224 for the attribute of the service requestor 110. If the service provider 120 is able to obtain the attribute of the service requester 110 (any or all of the attributes of the service requestor 110 when there is more than one) from the attribute storage unit 224, then the access control policy for the service requester 110 is determined based on the attribute so obtained.

However, there may be instances when the service provider 120 is unable to obtain the attribute of the service requester 110 from the attribute storage unit 224. For example, when users registered at movie theater A desire to view movies at a newly established movie theater B, if personal information (attributes) of movie viewers are not registered at the movie theater B, the movie theater B is unable to determine the attributes of the movie viewers. Accordingly, to determine the attributes of the movie viewers, movie theater B requests the attributes of the movie viewers from movie theater A so as to obtain the attributes of the movie viewers. The attributes may be requested from an unspecified large number of peers 130 in the P2P network through a communication unit 250. A peer 130 receiving a query for attributes from the service provider 120 may determine the attribute of the service requestor 110 from an attribute storage unit included in the peer 130 and provide the attribute to the service provider 120.

The attribute storage unit 224 stores attributes of the apparatuses in the network. The attributes in the attribute storage unit 224 may be updated each time the apparatuses in the network perform access to make a service request.

The access control policy determining unit 226 determines the access control policy for the service requester 110 based on the attribute of the service requestor 110 stored in the attribute storage unit 224 or the attribute of the service requestor 110 received from a peer 130. When the attribute is obtained from the peer 130, the access control policy may be determined by taking into consideration the trustworthiness of the peer 130 providing the attribute. The concept of the trustworthiness of peers 130 providing attributes of service requestors 110 is described below.

The access control module 210 receives a service request of the service requestor 110 and provides a service to the service requestor 110 according to the access control policy. The access control module 210 includes the service request receiving unit 212, a service providing unit 214, and a service storage unit 216.

The service request receiving unit 212 remotely receives a request for a service in the P2P network from the service requester 110. The service storage unit 216 stores a service resource to be provided to other apparatuses in the network.

The service providing unit 214 provides the service stored in the service storage unit 216 according to the access control policy determined by the access control policy determining unit 226. For example, if a decision (based on the attribute of the service requestor 110) that a requested service cannot be provided is made by the access control policy determining unit 226, the service provider 120 may restrict the provision of the service to the service requester 110 through the service providing unit 214.

The trustworthiness evaluating module 230 evaluates the trustworthiness of apparatuses (e.g., peers) in the network. As described above, when the service provider 120 is unable to determine the attribute of the service requestor 110, the attribute of the service requestor 110 may be obtained from a peer 130 in the network. When doing so, the service provider 120 evaluates the trustworthiness of the peer 130 providing the attribute, and takes the trustworthiness of the peer 130 into consideration when determining the access control policy of the service requester 110. Such an operation may be performed in view of the possibility that attribute information obtained from a peer 130 may be false.

The trustworthiness evaluating module of the peer 130 may determine the trustworthiness of the service provider 120 requesting the attribute of the service requester 110 so as to provide the requested attribute to the service provider 120 depending on the trustworthiness of the service provider 120. When a request is received from an apparatus with a low trustworthiness, provision of attribute information may be refused.

The trustworthiness evaluating module 230 includes a trustworthiness query unit 232, a trustworthiness storage unit 234, and a trustworthiness evaluating unit 236. The trustworthiness query unit 232 queries the trustworthiness storage unit 234 as to the trustworthiness of the peer 130 providing the attribute when the service provider 120 receives the attribute of the service requester 110 from the peer 130. When the trustworthiness of the peer 130 is unable to be obtained from the trustworthiness storage unit 234 of the service provider 120, the attribute of the peer 130 providing the attribute may be requested from another peer 130 in the network that is trusted by the service provider 120, via the communication unit 250.

The trustworthiness storage unit 234 stores the trustworthiness of apparatuses in the network. Trustworthiness may be given as a number, rank, etc. For example, the trustworthiness may be 1 when the relationship between two parties is one of directly knowing each other, the trustworthiness may be 0.5 when the relationship between two parties is indirectly established through a common acquaintance, and the trustworthiness may be 0 when the relationship between two parties is one in which the two parties are complete strangers. Further, since user identifications may be stolen or fraudulent, when information with respect to a stolen or fraudulent identification is obtained, a trustworthiness of −1 may be associated with the particular stolen identification. This provides an example merely for illustrative purposes. Various different trustworthiness schemes in addition to, or instead of, those described above may be implemented depending on the service environment in the network, type of services being exchanged, etc.

The trustworthiness evaluating unit 236 evaluates the trustworthiness of the peer 130 providing the attribute of the service requester 110 from the trustworthiness of the peer 130 obtained from the trustworthiness storage unit 234 of the service provider 120 and/or from the trustworthiness of the peer 130 obtained from the trustworthiness storage unit(s) 234 of another peer(s) 130 in the network. For example, for the trustworthiness of the peer 130 providing the attribute of the service requester 110, if a trustworthiness rating of 1 is stored in the trustworthiness storage unit 234 of the service provider 120, a trustworthiness rating of 0.5 is stored in the trustworthiness storage unit 234 of another peer 1, and a trustworthiness rating of 0.6 is stored in the trustworthiness storage unit 234 of yet another peer 2, the trustworthiness evaluating unit 236 obtaining these trustworthiness ratings averages the trustworthiness ratings of the apparatuses to provide an evaluation of 0.7 for the trustworthiness of the peer 130 providing the attribute of the service requestor 110.

Further, the trustworthiness evaluating unit 236 may classify the trustworthiness of peers 130 based on a threshold value such that the access control policy determining unit 226 determines the access control policy only with respect to attributes provided by peers 130 having trustworthiness ratings that are equal to or greater than the threshold value. For example, the access control policy may be determined only based on attributes provided by peers 130 having trustworthiness ratings of 0.8 or higher.

The access control policy determining unit 226 of the attribute processing module 220 determines the access control policy for the service requestor 110 based on the attribute obtained from the attribute storage unit 224 or from an attribute storage unit of the peer 130, and based on the trustworthiness of the peer 130 providing the attribute. For example, if the attribute forming the basis for determining the access control policy is expressed as a numerical value, such as age and number of service requests of the service requestor 110, an average of the trustworthiness value and attribute value may be obtained to determine the access control policy. Further, separation may be performed of attributes obtained from peers 130 having trustworthiness ratings at or above a specific threshold value, and an average of the attributes obtained from these peers 130 having trustworthiness ratings at or above the threshold value may be obtained to determine the access control policy.

The communication unit 250 relays communications between the apparatuses, including the service requester 110 and the service provider 120, in the network.

Figure 3:
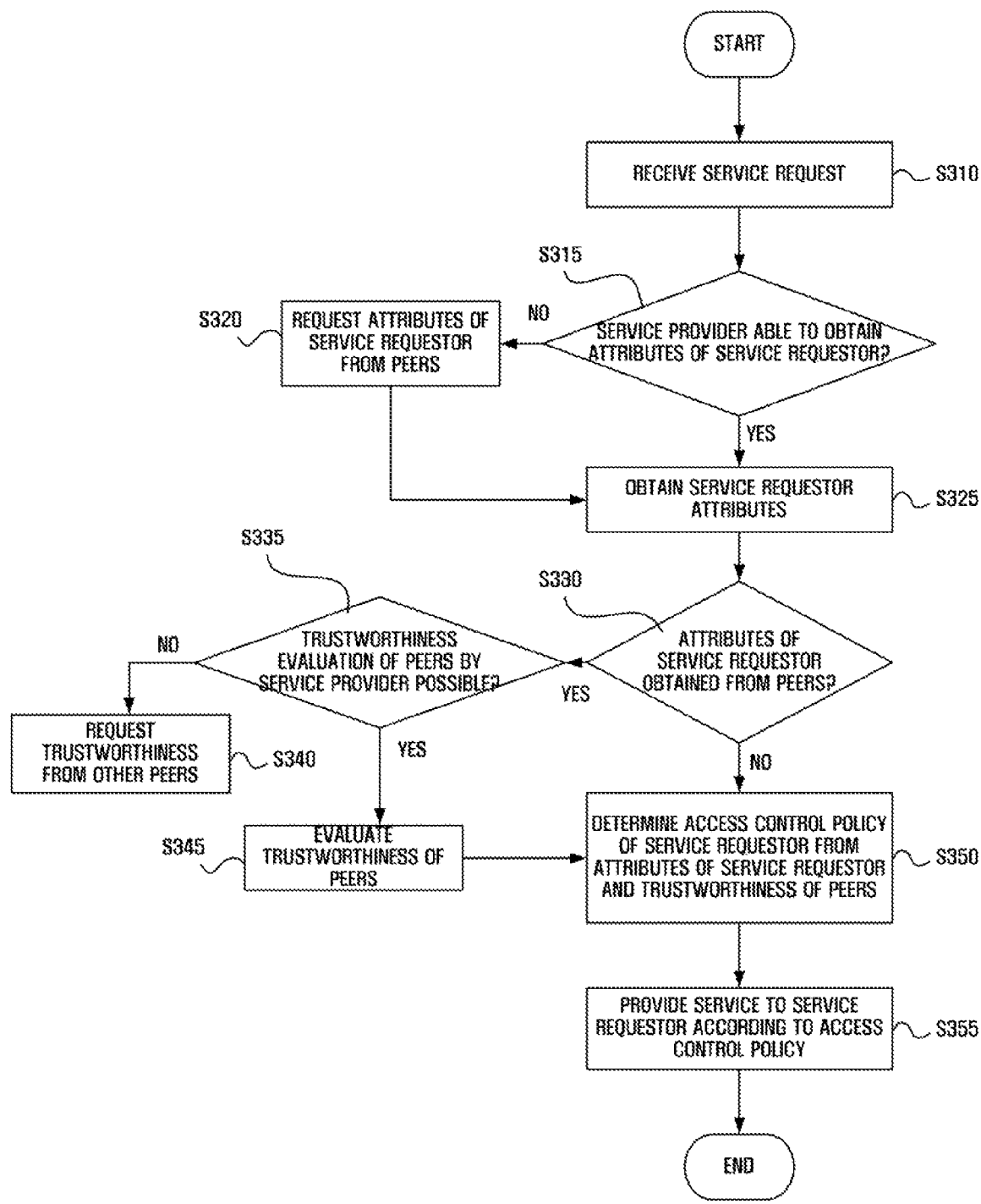
FIG. 3 is a flowchart of a process of controlling access in a P2P network according to an embodiment of the present invention.

A process of controlling access in a P2P network according to an embodiment of the present invention will now be described with reference to FIG. 3. First, a service request of the service requester 110 is received through the service request receiving unit 212 in operation S310.

After receipt of the service request, the attribute query unit 222 queries the attribute storage unit 224 as to the attribute of the service requestor 110. If the service provider 120 is able to obtain the attribute of the service requester 110 from its own attribute storage unit 224 in operation S315, the service provider 120 obtains the attribute of the service requester 110 from the attribute storage unit 224 in operation S325. However, if the service provider 120 is unable to obtain the attribute of the service requester 110 from the attribute storage unit 224, the service provider 120 requests the attribute of the service requestor 110 from an unspecified plurality of peers 130 or from peers 130 with a high trustworthiness rating through the communication unit 250 in operation S320, such that the attribute of the service requestor 110 is obtained from attribute storage units of the peers 130. During such a request, the peers 130 may or may not provide the attribute information of the service requestor 110, depending on the trustworthiness of the service provider 120 making the attribute request.

The access control policy determining unit 226 determines the access control policy for the service requester 110 based on the obtained attribute information of the service requester 110. When the attribute of the service requester 110 is obtained from peers 130 in operation S330, then the trustworthiness of the peers 130 is evaluated by the trustworthiness evaluating modulate 230. In operation 335, if the trustworthiness evaluation of the peers 130 by the trustworthiness evaluating module 230 of the service provider 120 is possible, then the trustworthiness of the peers 130 is evaluated by the trustworthiness evaluating module 230 in S345, while if trustworthiness information of the peers 130 providing the attributes is not contained in the trustworthiness evaluating module 230 so that trustworthiness evaluation is not possible, then the trustworthiness of the peers 130 providing the attribute of the service requester 110 is requested from other peers 130 in operation S340 to thereby evaluate the trustworthiness of the peers 130 in operation S345.

The access control policy determining unit 226 determines the access control policy of the service requester 110 based on the attribute of the service requestor 110 and the trustworthiness of the peers 130 providing the attribute of the service requester 110 in operation S350. The service providing unit 214 provides the service resource stored in the service storage unit 216 to the service requestor 110 according to the access control policy determined by the access control policy determining unit 226.

The apparatus and method to control access in a P2P network according to aspects of the present invention have several advantages. First, in a P2P environment, the attribute of the service requestor may be evaluated without the use of a central processor to perform access control. Second, when the service provider is unable to determine the attribute of the service requester, attribute evaluation is performed by obtaining the attribute from peers in the network. Therefore, even if the service provider does not know the attribute of the service requester, the service provider can nevertheless perform access control through dynamic attribute evaluation. Third, by evaluating the attribute of the service requestor by taking into consideration the trustworthiness of the peers providing the attribute of the service requester, the reliability of attribute evaluation may be enhanced. Additional advantages will also be apparent to those skilled in the art.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. An apparatus to control access in a P2P (peer-to-peer) network, the apparatus comprising:
    a processor which executes the operation of:
    an attribute processing module to obtain an attribute of a service requestor and to determine an access control policy for the service requestor based on of the obtained attribute; and
    an access control module to control the provision of a service to the service requestor according to the access control policy;
    wherein if a service provider is unable to obtain the attribute of the service requestor, the service provider obtains the attribute of the service requestor from at least one peer in the network, and the attribute processing module determines the access control policy based on the obtained attribute of the service requestor and a trustworthiness of the at least one peer providing the attribute of the service requestor.

2. The apparatus of claim 1, wherein the processor further executes the operation of a trustworthiness evaluating module to evaluate the trustworthiness of the at least one peer.

3. The apparatus of claim 2, wherein the attribute processing module comprises:
    an attribute storage unit to store attributes of the at least one peer; and
    an access control policy determining unit to determine the access control policy for the service requestor based on the attribute of the service requestor stored in the attribute storage unit or the attribute of the service requestor obtained from the peer.

4. The apparatus of claim 2, wherein the access control module further comprises:
    a service storage unit to store the service to be provided to the service requestor; and
    a service providing unit to provide the stored service to the service requestor according to the access control policy.

5. The apparatus of claim 2, wherein if the trustworthiness evaluating module is unable to evaluate the trustworthiness of the at least one peer providing the attribute of the service requestor, the trustworthiness evaluating module obtains an evaluation of the trustworthiness of the at least one peer from at least one other peer in the network.

6. The apparatus of claim 5, wherein the trustworthiness evaluating module comprises:
    a trustworthiness storage unit to store the trustworthiness of the at least one peer in the network; and
    a trustworthiness evaluating unit to evaluate the trustworthiness of the at least one peer based on the trustworthiness of the at least one peer stored in the trustworthiness storage unit or the trustworthiness of the at least one peer obtained from the at least one other peer.

7. The apparatus of claim 2, wherein the at least one peer receiving a request from the service provider for the provision of the attribute of the service requestor determines whether to provide the attribute of the service requestor to the service provider according to a trustworthiness of the service provider.

8. A method of controlling access in a P2P (peer-to-peer) network, the method comprising:
   receiving a service request from a service requestor;
   obtaining an attribute of the service requestor;
   determining an access control policy for the service requestor based on the attribute of the service requestor; and
   controlling the provision of a service to the service requestor according to the access control policy;
   wherein if a service provider is unable to obtain the attribute of the service requestor when obtaining the attribute of the service requestor, the service provider obtains the attribute of the service requestor from at least one peer in the network, and the access control policy is determined based on the obtained attribute of the service requestor and a trustworthiness of the at least one peer providing the attribute of the service requestor.

9. The method of claim 8, further comprising:
   evaluating the trustworthiness of the at least one peer after obtaining the attribute of the service requestor from the at least one peer.

10. The method of claim 9, wherein if the trustworthiness of the at least one peer providing the attribute of the service requestor is unable to be evaluated, an evaluation of the trustworthiness of the at least one peer is obtained from at least one other peer.

11. The method of claim 9, wherein the at least one peer receiving a request from the service provider for the provision of the attribute of the service requestor determines whether to provide the attribute of the service requestor to the service provider according to a trustworthiness of the service provider.

12. A system to provide services in a computer network, the system comprising:
   a service requestor to request a service;
   a service provider to receive the request from the service requestor, to determine whether to provide the service based on attributes of the service requestor stored in the service provider, and to provide the service based on the result of the determination; and
   at least one peer;
   wherein, if the service provider does not have the attributes stored, the service requestor requests the attributes from the at least one peer, and the service provider determines to provide the service based on the obtained attributes of the service requestor and a trustworthiness of the at least one peer providing the attributes of the service requestor.

13. The system of claim 12, wherein the service provider comprises:
   a communication unit to communicate with the service requestor and the at least one peer;
   an attribute processing module to determine whether to provide the service based on the attributes of the service requestor; and
   an access control module to selectively provide the service to the service requestor based on the determination of the attribute processing module.

14. The system of claim 13, wherein the service provider further comprises:
   a trustworthiness evaluating module to evaluate the trustworthiness of the service requestor and the at least one peer;
   wherein the attribute processing module determines whether to provide the service based on the attributes of the service requestor and the evaluation of the trustworthiness evaluating module.

15. The system of claim 14, wherein each of the at least one peers comprise a trustworthiness evaluating module to evaluate the trustworthiness of the service provider requesting the attributes.

16. The system of claim 14, wherein the trustworthiness evaluating module determines that the service requestor or the at least one peer is trustworthy if a trustworthiness value of the service requestor or the at least one peer is greater than or equal to a threshold value.

17. The system of claim 13, wherein the attribute processing module includes an attribute storage unit to store the attributes of the service requestor.

18. The system of claim 12, wherein:
   the service requestor is one of the at least one peer; and
   the service provider is one of the at least one peer.

* * * * *